US012809613B2

(12) United States Patent
Inoue

(10) Patent No.: US 12,809,613 B2
(45) Date of Patent: Nov. 24, 2026

(54) PROGRAM UPDATE METHOD, PROGRAM UPDATE SYSTEM AND MOBILE OBJECT

(71) Applicant: HONDA MOTOR CO., LTD., Tokyo (JP)

(72) Inventor: Genta Inoue, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 417 days.

(21) Appl. No.: 18/542,620

(22) Filed: Dec. 16, 2023

(65) Prior Publication Data

US 2025/0199793 A1 Jun. 19, 2025

(51) Int. Cl.
*G06F 8/65* (2018.01)

(52) U.S. Cl.
CPC .................................... *G06F 8/65* (2013.01)

(58) Field of Classification Search
CPC ................................................ G06F 8/60–65
See application file for complete search history.

(56) References Cited

U.S. PATENT DOCUMENTS

| | | | | |
|---|---|---|---|---|
| 10,564,954 | B2 | 2/2020 | Tillman et al. | |
| 11,449,327 | B2 | 9/2022 | David et al. | |
| 11,656,771 | B2 | 5/2023 | Harata et al. | |
| 11,670,117 | B2 | 6/2023 | Shionoya et al. | |
| 2016/0371076 | A1* | 12/2016 | Moeller | G06F 8/654 |
| 2020/0174779 | A1* | 6/2020 | David | G06F 8/654 |
| 2022/0283797 | A1 | 9/2022 | Nagamitsu | |
| 2022/0317994 | A1 | 10/2022 | Nagamitsu | |
| 2022/0342653 | A1 | 10/2022 | Ishikawa et al. | |
| 2023/0021129 | A1 | 1/2023 | Ni et al. | |
| 2023/0051776 | A1 | 2/2023 | Jeong et al. | |
| 2024/0193591 | A1* | 6/2024 | Ueki | G06Q 20/145 |
| 2026/0030112 | A1* | 1/2026 | Yan | G06F 8/65 |

FOREIGN PATENT DOCUMENTS

| | | | |
|---|---|---|---|
| CN | 114647424 | A | 6/2022 |
| CN | 111897546 | B | 8/2022 |
| CN | 111038413 | B | 4/2023 |
| JP | 7058629 | B2 | 4/2022 |

* cited by examiner

*Primary Examiner* — Duy Khoung T Nguyen
(74) *Attorney, Agent, or Firm* — WHDA, LLP

(57) ABSTRACT

A program update method of a mobile object by acquiring new program from a server device via a network comprises: determining by the mobile object whether a predetermined abnormal condition is met or not, and when it is determined that the predetermined abnormal condition is met, sending a signal indicating abnormality from the mobile object to the server device; determining by the server device whether a purge process is required or not based on the received signal indicating abnormality, and when it is determined that the purge process is required, sending a purge instruction from the server device to the mobile object; according to the received purge instruction, by the mobile object, deleting a data stored in a memory device equipped with the mobile object regarding update of a program of an electronic control unit equipped with the mobile object.

19 Claims, 20 Drawing Sheets

| UPDATE ID | VIN |
|---|---|
| 2023001 | XXXXX |
| | XXXXX |
| | XXXXX |
| | XXXXX |
| | XXXXX |
| | XXXXX |

*FIG. 7*

| UPDATE ID | VERSION | STATUS | RESULT | FEATURE | ECU |
|---|---|---|---|---|---|
| 2023001 | 2.4.5 | UPDATED | S | | xxx |
| 20230002 | 2.1.8 | SCHEDULED (TIME XXXXX) | 0 | | xxx |

*FIG. 9*

| UPDATE ID | VIN | ABNORMAL |
|---|---|---|
| 20230002 | DMV7146P | 1 |

*FIG. 10*

| UPDATE ID | VIN | VERSION | STATUS | RESULT | FEATURE | ABNORMAL | THRESHOLD |
|---|---|---|---|---|---|---|---|
| 2023001 | H48IDG8SK | 2.4.5 | UPDATED | 5 | | 0 | 5 |
| 20230002 | DMV7146P | 2.1.8 | SCHEDULED (TIME XXXXX) | 0 | | 2 | 4 |

*FIG. 12*

| UPDATE ID | VERSION | STATUS | RESULT | FEATURE | ECU | TIMER |
|---|---|---|---|---|---|---|
| 2023001 | 2.4.5 | UPDATED | S | | xxx | |
| 20230002 | 2.1.8 | SCHEDULED (TIME XXXXX) | 0 | | xxx | |

*FIG. 19*

PROGRAM UPDATE METHOD, PROGRAM UPDATE SYSTEM AND MOBILE OBJECT

BACKGROUND

Technical Field

The present disclosure relates to a program update method, program update system and mobile object.

Related Art

An Electronic Control Unit (ECU) which is equipped with a mobile object such as a vehicle provides various functions implemented by executing a software program. The software program is updated by a program update system.

SUMMARY

In one aspect of the present disclosure, a program update method of a mobile object by acquiring new program from a server device via a network, the method comprising:

(i) determining by the mobile object whether a predetermined abnormal condition is met or not, and when it is determined that the predetermined abnormal condition is met, sending a signal indicating abnormality from the mobile object to the server device;

(ii) determining by the server device whether a purge process is required or not based on the received signal indicating abnormality, and when it is determined that the purge process is required, sending a purge instruction from the server device to the mobile object;

(iii) according to the received purge instruction, by the mobile object, deleting a data stored in a memory device equipped with the mobile object regarding update of a program of an electronic control unit equipped with the mobile object.

BRIEF DESCRIPTION OF THE DRAWINGS

The advantages of the disclosure will become apparent in the following description taken in conjunction with the following drawings.

FIG. 7 is an example of a table which shows data structure stored in the server 70.

FIG. 9 is an example of a table which shows data structure stored in the mobile object.

FIG. 10 is an example of data structure of abnormality signal.

FIG. 12 is an example of a table which shows data structure stored in the server.

FIG. 19 is an example of a table which shows data structure stored in the mobile object.

DESCRIPTION OF EXEMPLARY EMBODIMENTS

Figure 1:
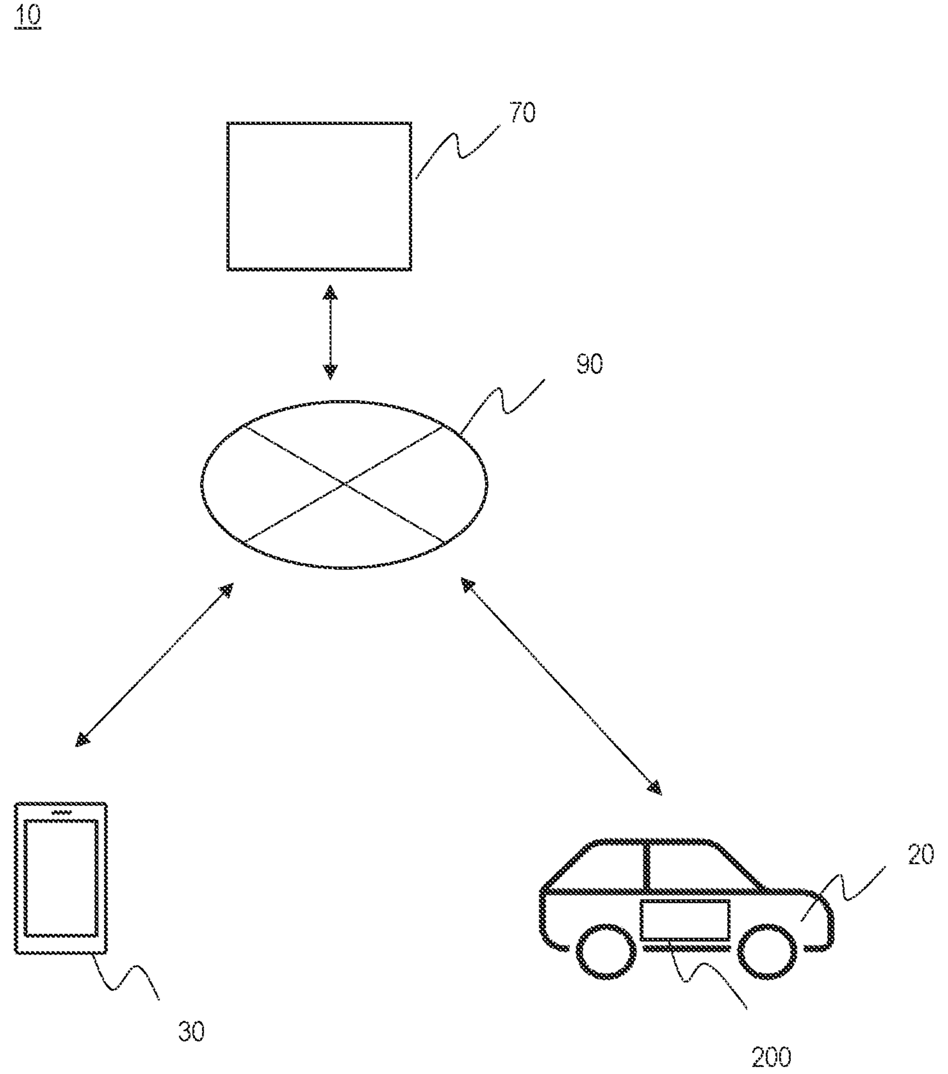
FIG. 1 schematically describe an update system 10 according to one embodiment.

Hereinafter, the present disclosure will be described through embodiments, but the following embodiments do not limit the invention according to the claims. In addition, not all combinations of features described in the embodiments are essential to the solution of the invention. Hereinafter, like elements are described by using like reference numerals and repetitive description of like elements employed in one or more embodiments described herein is omitted.

FIG. 1 schematically shows an update system 10 according to one embodiment. The update system 10 includes a vehicle 20 and an external apparatus 70 such as a server device. The vehicle 20 includes a control system 200. The control system 200 is responsible for control of the vehicle 20 and communication with the external apparatus 70 via a communication network 90. The communication network 90 includes an IP network such as the Internet, a P2P network, a dedicated line including a VPN, a virtual network, a mobile communication network, and the like. A mobile terminal 30 may be also used for a user and connected to the communication network 90.

In the vehicle 20, the control system 200 includes a plurality of ECUs (Electronic Control Units) configured to perform control of the vehicle 20. The control system 200 is configured to acquire an update program of the ECU provided to the control system 200 from an outside. For example, the control system 200 is configured to receive an update program, which is transmitted from the external apparatus 70, via the communication network 90 by wireless communication. The control system 200 is configured to reprogram the ECU provided to the control system 200 by rewriting a program, which is executed by the ECU provided to the control system 200, with the update program. Such reprogramming is performed for upgrade and the like of functions of the ECU provided to the control system 200. In this way, the control system 200 is configured to update the ECU by reprogramming the ECU by OTA (Over The Air). In the present embodiment, rewriting a program, which is executed by a device such as the ECU, by the update program is referred to as 'program update'.

Figure 2:
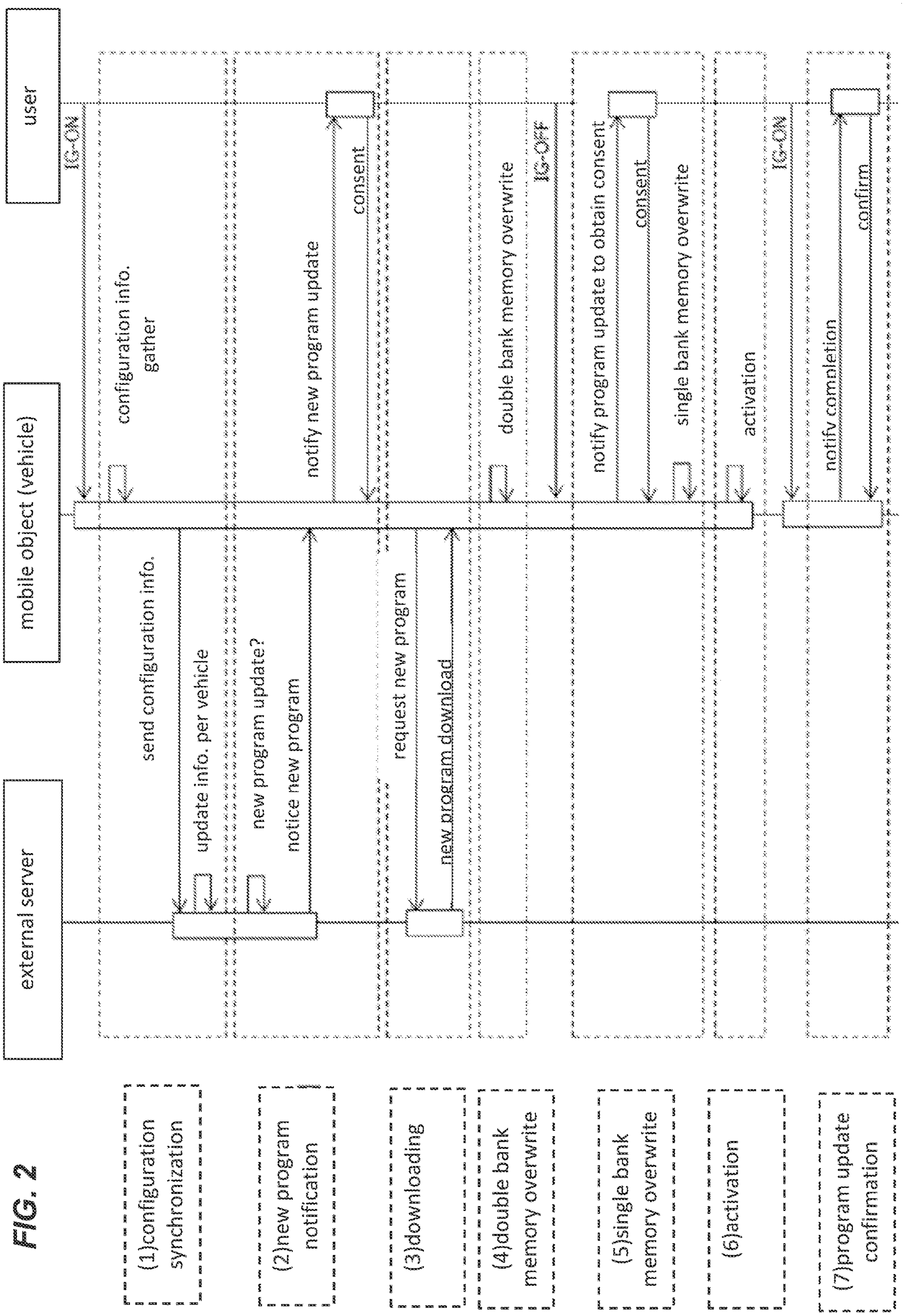
FIG. 2 schematically shows an example sequence of program update processing.

When performing the 'program update,' a user of the mobile object is asked to provide a consent. Such a consent from the user is obtained when downloading a new program from the external apparatus 70 and when executing the program update by using the downloaded new program. Here, general flow of program update is described. FIG. 2 schematically shows an example sequence of program update processing. The flow of program update comprises seven steps: (1) configuration synchronization, (2) new program notification, (3) downloading, (4) double bank memory overwrite, (5) single bank memory overwrite, (6) activation, (7) program update confirmation.

In the (1) configuration synchronization, for example, the vehicle 20 gathers configuration information of the vehicle 20 and sends the information to the external apparatus such as a server 70. The server updates own information per vehicle by using the received configuration information. In the (2) new program notification, for example, the server 70 determines whether there is any necessity of new program update, and if so, sends a notification of new program update to the vehicle 20. Upon receiving the notification, the vehicle 20 notifies a user of the necessity of the new program update by, for example, displaying notice and obtains a consent by the user for the new program update. This notice may be performed by using an interface equipped with the vehicle 20 or the mobile terminal 30. In the (3) downloading, for example, the vehicle 20 sends a request for the new program. In response, the server 70 causes the vehicle 20 to download and save the new program into a memory device equipped with the vehicle 20. By using the downloaded and saved program, the vehicle 20 overwrites a double bank memory in the (4) double bank memory overwrite. The steps of the (1) configuration synchronization, the (2) new program notification, the (3) downloading, and the (4) double bank memory overwrite are all performed during the IG power supply is on state.

When the IG power supply becomes off, in the (5) single bank memory overwrite, the vehicle 20 informs the user of down time for program update by, for example, displaying information and obtains a consent by the user for the new program update. Then, the vehicle 20 performs the single bank memory overwrite. In the (6) activation, the vehicle 20 activates the updated program.

When the IG power supply becomes on, the vehicle 20 notifies the user of the completion of the program update and obtains confirmation by the user in the (7) program update confirmation. Also, the vehicle 20 sends configuration information including new program which is now being executed.

The above-described (1) configuration synchronization is performed every time when the IG power supply becomes on from off state. For example, the vehicle 20 may be a vehicle with an internal combustion engine, an electric vehicle such as a Battery Electric Vehicle (BEV), a Hybrid Electric Vehicle (HEV), a Plug-in Hybrid Electric Vehicle (PHEV), an Extended Range Electric Vehicle (EREV). The event in which the IG power supply becomes on is an example of the event that the mobile object is powered on. In another example, the mobile object may be powered on by pressing a brake pedal of the mobile object. In yet another example, the mobile object may be powered on by receiving an instruction from the mobile terminal 30.

Figure 3:
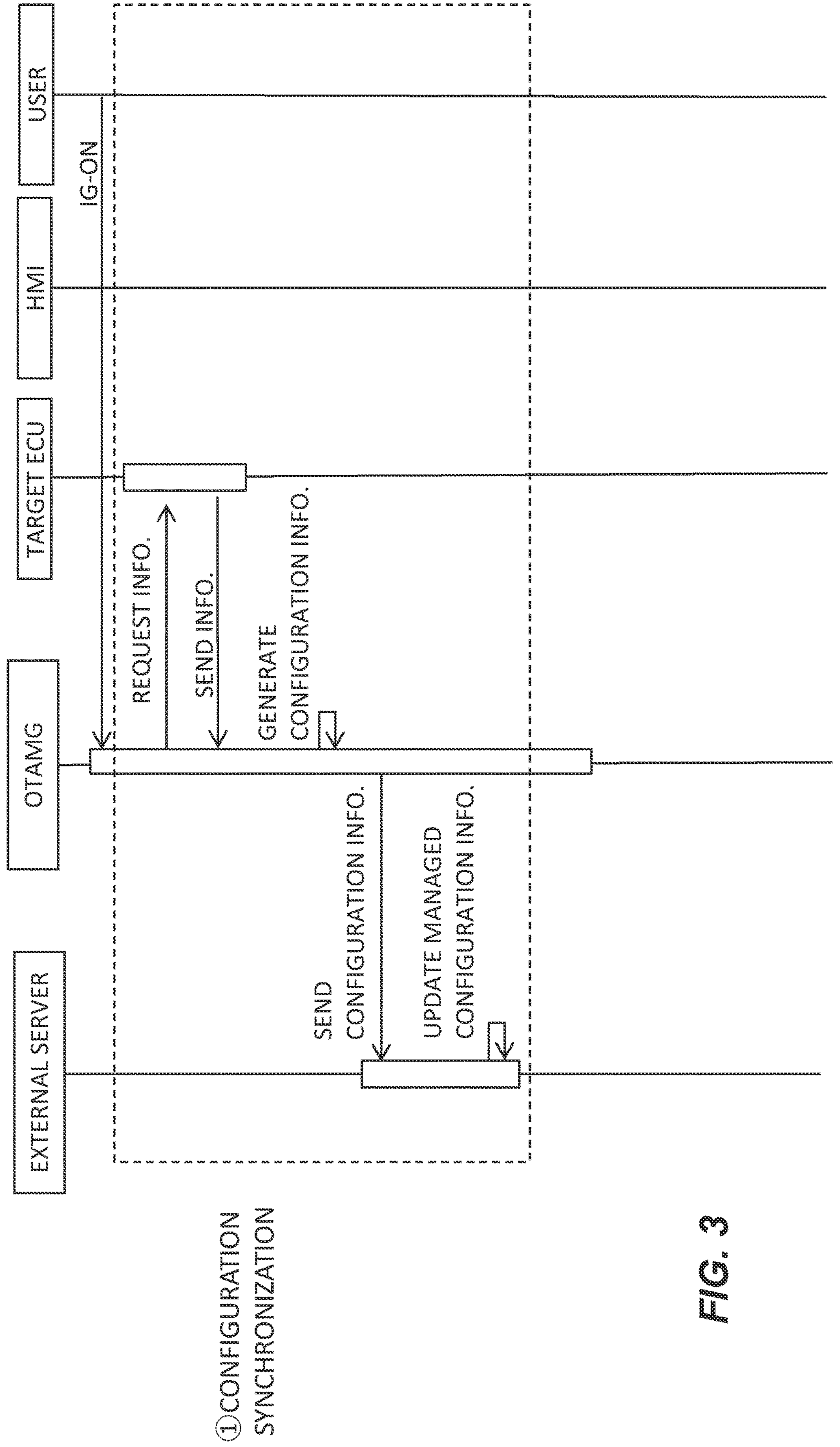
FIG. 3 schematically shows an example sequence of configuration synchronization.

The configuration synchronization is further described by referring to FIG. 3. FIG. 3 schematically shows an example sequence of configuration synchronization. Every time when the IG power supply becomes on from off state, OTA manager sends a request to a target ECU which is an ECU subject to the currently ongoing program update. In response to the request, the target ECU sends requested information regarding configuration such as hardware configuration of the target ECU and/or software configuration of the target ECU. Based on the received information, the OTA manager generates configuration information of the vehicle and sends the generated information to the external server 70 via the communication network 90.

The server 70 manages the configuration information per vehicle. Thus, when the server receives the configuration information from the vehicle 20, the server updates the configuration of the vehicle 20 maintained in the storage device of the server 70.

When IG is turned on, the OTA manager performs the acquisition process of each ECU configuration information. At this time, for some reason, the information may not be acquired properly. For example, the OTA manager does not receive a response from the ECU in a predetermined amount of time. There are many possible reasons for this kind of information acquisition failure. For example, when the firmware of the ECU to be updated is too slow, it may take more time than the predetermined expected amount of time. In other possibility, the download process failed to download the new program properly which might cause trouble. In such a case, it is required for the vehicle 20 to delete or erase the downloaded new program and download the new program again from the server 70.

However, it is difficult for the vehicle to determine the cause of the information acquisition failure among multiple possible reasons. Assuming a case in which the OTA manager determines necessity of program re-download when the configuration information has not been received after a predetermined amount of time, a reset process such as deleting software that has already been downloaded to the OTA manager or has been installed in a double bank memory of ECU is necessary. Thus, the vehicle may end up discarding downloaded or installed software even though the vehicle could have acquired the configuration information with a little more waiting time. This discarding necessitates recommunication to the server and redownload of the same program again from the server even though a little more additional wait time could avoid it. Re-downloading and re-installing of the program could lead to increased communication costs and delays in software updates.

Thus, it is preferable to improve accuracy in determining cause of the information acquisition failure. For example, by determining whether or not a purge process is necessary based on multiple pieces of information on the server side, unnecessary purging processes can be suppressed, which could prevent increased communication costs and delays in software updates.

For example, the server manages program update based on model, type, trim, and year of the vehicle. For example, the server identifies vehicles which are subject to a specific program update based on model and year and trim, then generate a group of the vehicles with a specific model and year and trim. That is, a specific program update is managed for a specific group of the vehicles. In the above-described (2) new program notification, for example, the server 70 sends a notification of new program update to all of the vehicles belong to the specific group. The specific program update is assigned a unique identification ID (update ID). The specific program update is also called "campaign." One specific campaign may include a plurality of vehicles which are subject to the campaign.

According to the inventor's study, factors which contribute to delay in response from ECU may vary per campaign.

Thus, it is preferable to manage determination of the cause of the information acquisition failure per each specific program update. For example, it is possible to count the number of times the server 70 receives a signal indicating abnormality (abnormality signal). The accumulated number of the abnormality signal is compared to a threshold to decide necessity of re-download. This threshold may be managed and adjusted per the specific program update.

For example, a specific program update may be directed to a specific ECU which has firmware requiring heavier processing load and longer response time. In such a case, it is preferable to set the threshold to a larger number. Thus, by varying and adjusting the threshold depending on the specific program update, it becomes possible to improve accuracy in determining the cause of the information acquisition failure.

The condition may be a condition that the server 70 receives the abnormality signal predetermined number of times continuously without interruption by successful configuration synchronization. Every time the mobile object is powered on, the OTA manager performs the configuration synchronization. Thus, there may be a case in which powering on the vehicle occurs many times before the program update is completed. Depending on the situation, the same ECU may return a response in the predetermined amount of time and may not return a response in the predetermined amount of time. In such a situation, it would be better to wait completion of the program update for a while and it would not be necessary to re-download the new program urgently. By having a condition of receiving abnormal signal continuously, it becomes possible to exclude false abnormal situation to improve accuracy in determining the cause of the information acquisition failure.

The condition may be a condition that the server 70 receives the abnormality signal from other vehicle in the same campaign ID. As described above, the server 70 may manage a specific program update with a unique campaign ID which is associated with a plurality of vehicles. Considering the status of the other vehicles in the same campaign ID, it is possible to find tendency in the current program update. The fact that the other vehicle also sends abnormality signal may be interpreted that information acquisition failure may happen more frequently in the current program update. For example, in such a situation, it may be possible to lower the threshold for re-downloading the new program.

Figure 4:
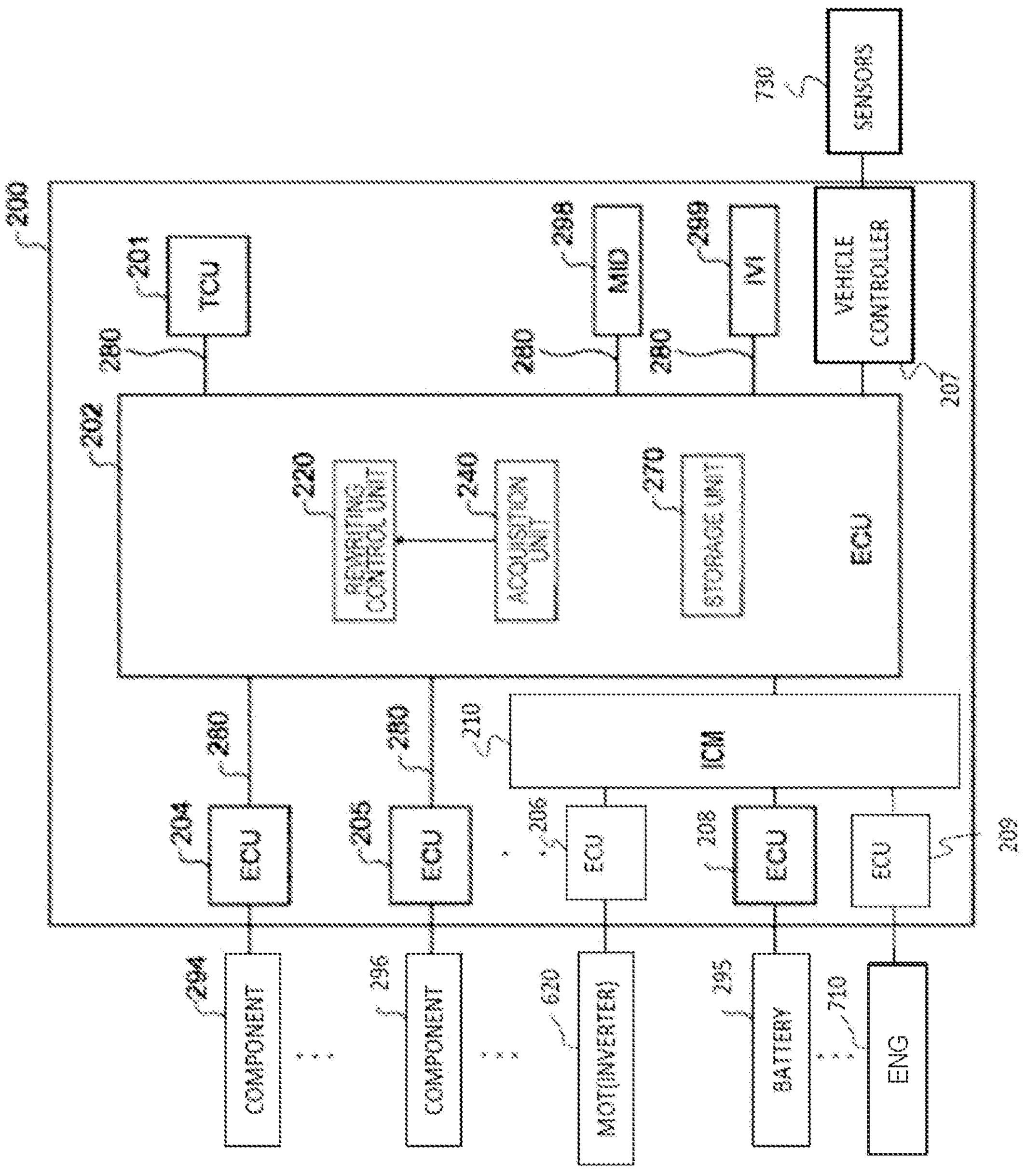
FIG. 4 schematically shows a system configuration provided to the control system 200, together with a to-be-controlled device.

FIG. 4 schematically shows a system configuration provided to the control system 200, together with a to-be-controlled device. The control system 200 has a TCU 201, a SCU 203, an ECU 202, an ECU 204, an ECU 205, an ECU 206, an ECU 208, an ECU 209, an MID 298, an IVI 299, and an Intelligent Control Module (ICM) 210. The ICM 210 is a control unit which manages and controls a vehicle drive system such as an electric drive motor 620, a battery 295 and an internal combustion engine 710.

The ECU 202 is connected to the TCU 201, the SCU 203, the ECU 204, the ECU 205 and the ICM 210 as well as a vehicle controller 207 via an in-vehicle communication line 280. The ECU 202 is configured to mutually communicate with the TCU 201, the SCU 203, the ECU 204, the ECU 205, the ICM 210, the MID 298, the vehicle controller 207 and the IVI 299 via the in-vehicle communication line 280. The ECU 202 is configured to collectively control the TCU 201, the SCU 203, the ECU 204, the ECU 205, the ICM 210, the MID 298 and the IVI 299. The in-vehicle communication line 280 may be configured to include a CAN (Controller Area Network), an Ether Network and the like, for example. The ECU 202 is also configured to control the ECU 206, the ECU 208, and the ECU 209 via the ICM 210.

The TCU 201 is a telematics control unit. The TCU 201 is mainly responsible for mobile communication. The TCU 201 is configured to transmit and receive data to and from the external server 10, based on control of the ECU 202. The TCU 201 is configured to receive the update program transmitted from the server 10 by mobile communication, based on control of the ECU 202. The TCU 201 can function as a wireless communication unit.

The SCU 203 is a short range communication unit. The SCU 203 is mainly responsible for short range communication. The SCU 203 is configured to transmit and receive data to and from the mobile terminal 30, based on control of the ECU 202. The SCU 203 is configured to communicate with the mobile terminal 30 via short range communication such as Bluetooth®, Wi-Fi®, NearLink, near-field communication (NFC), LPWAN, ultra-wideband (UWB), based on control of the ECU 202. The SCU 203 may also be configured to communicate with the mobile terminal 30 via wired communication such as USB, USB-C® and Thunderbolt®.

The MID 298 is a multi-information display. The IVI 299 is, for example, an in-vehicle infotainment information device (IVI). The MID 298 and the IVI 299 can function as a display control unit. The IVI 299 has a wireless LAN communication function. The IVI 299 is configured to receive the update program transmitted from the server 10 by wireless LAN communication, based on control of the ECU 202. The MID 298 and the IVI 299 can be a part of HMI (Human Machine Interface) 22. The ECU 202 communicates with the vehicle controller 207 to receive detection information such as door-lock/unlock and IG on/off detected by sensors 730 such as a door lock sensor and an IG on/off sensor.

The ECU 204, the ECU 205, the ECU 206, the ECU 208 and the ECU 209 are each an ECU as a vehicle control unit configured to control at least a part of the vehicle 20. The ECU 204, the ECU 205, the ECU 206, the ECU 208 and the ECU 209 are examples of the 'mobile object control unit'. The ECU 204, the ECU 205, the ECU 206, the ECU 208 and the ECU 209 are configured to control a variety of devices provided to the vehicle 20. ECU 204 and ECU 205 are the first electronic control unit which is not related to a control of a component of the mobile object which is a part of the high-voltage power system. For example, the ECU 204 is configured to control a component such as a power window 294, and the like. The ECU 205 is configured to control a component such as an automatic light 296, and the like.

ECU 206 and ICM 210 are the second electronic control unit which controls a component of the mobile object which is a part of the high-voltage power system. For example, the ECU 206 is configured to control the electric motor 620, and the like. Next, the ECU 208 is configured to control a battery 295, and the like. The battery 295 is a high-voltage battery which functions as a power supply for driving a power source such as an electric motor of a vehicle, for example. The battery 295 is, for example, a lithium-ion battery or the like. The ECU 209 is configured to control the internal combustion engine (ICE) 710, and the like. The electric motor 620, the battery 295 and the ICE 710 are examples of components of a vehicle drive system which is managed and controlled by the ICM 210. Note that, in FIG. 4, the power window 294, the automatic light 296, the battery 295, the ICE 710 and the electric motor 620 are examples of the to-be-controlled device provided to the vehicle 20, and the vehicle 20 may have a to-be-controlled device other than the devices shown in FIG. 4.

In the present embodiment, the system configuration where the control system 200 includes the TCU 201, the SCU 203, the ECU 202, the ECU 204, the ECU 205, the ECU 206, the ECU 208. The ECU 209, the ICM 210, the MID 298 and the IVI 299 is exemplified. However, the system configuration of the control system 200 is not limited to the example of the present embodiment. In addition, in the present embodiment, as an example, it is described that the mobile object control unit that may be a target of the program update is the ECU 204, the ECU 205, the ECU 206, the CIM 210, and the ECU 202 functions as a 'program update control apparatus' configured to control the program update. Note that, the mobile object control unit that may be a target of the program update is not limited to these ECUs. The mobile object control unit that may be a target of the program update may be any of the TCU 201, the ECU 202, the ECU 204, the ECU 205, the ECU 206, the ECU 208, the ECU 209, the ICM 210, the MID 298 and the IVI 299.

The ECU 202 is configured to function as a program update control apparatus (also referred to as 'OTA manager') configured to control the program update of the ECU. The ECU 202 includes a rewriting control unit 220, an acquisition unit 240, and a storage unit 270.

The rewriting control unit 220 is configured to perform control of rewriting a program, which is executed by the ECU configured to control at least a part of the vehicle 20, to a new program. The acquisition unit 240 is configured to acquire a new program from the server 70.

Figure 5:
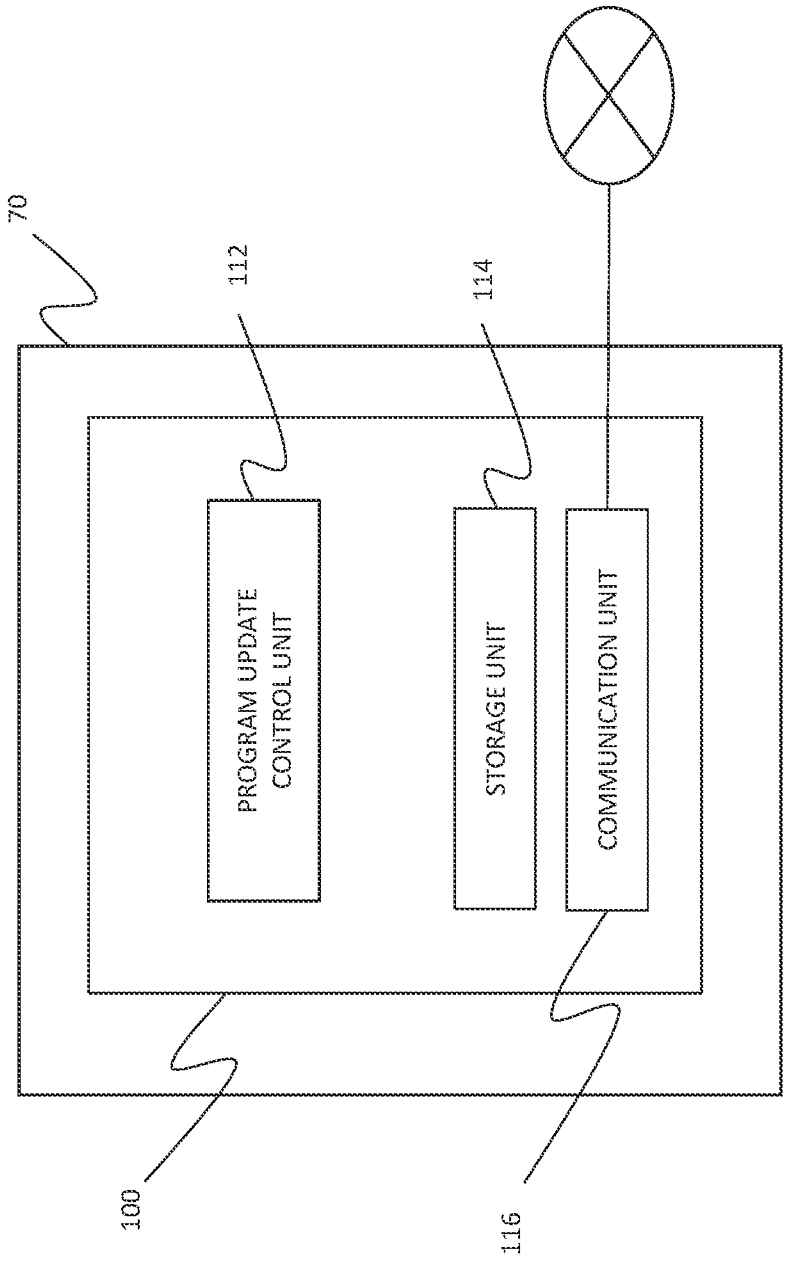
FIG. 5 schematically shows a configuration of the server.

FIG. 5 schematically shows a configuration of the server 70. The server 70 includes a control system 100. The control system 100 is responsible for control of the server 70 and communication with the vehicle 20 and the mobile terminal 30 via the communication network such as a mobile communication network through the communication unit 116 such as a network card. The control system 100 includes a program update control unit and a storage unit 114.

The program update control unit 112 maintains current version of program for each vehicle registered in the server 70 by timely updating a program for each ECU. The program update control unit 112 sends and receives information and data to and from the vehicle 20 and the mobile terminal 30 through the communication unit 116, and save and maintain data stored in the storage unit 114.

Figure 6:
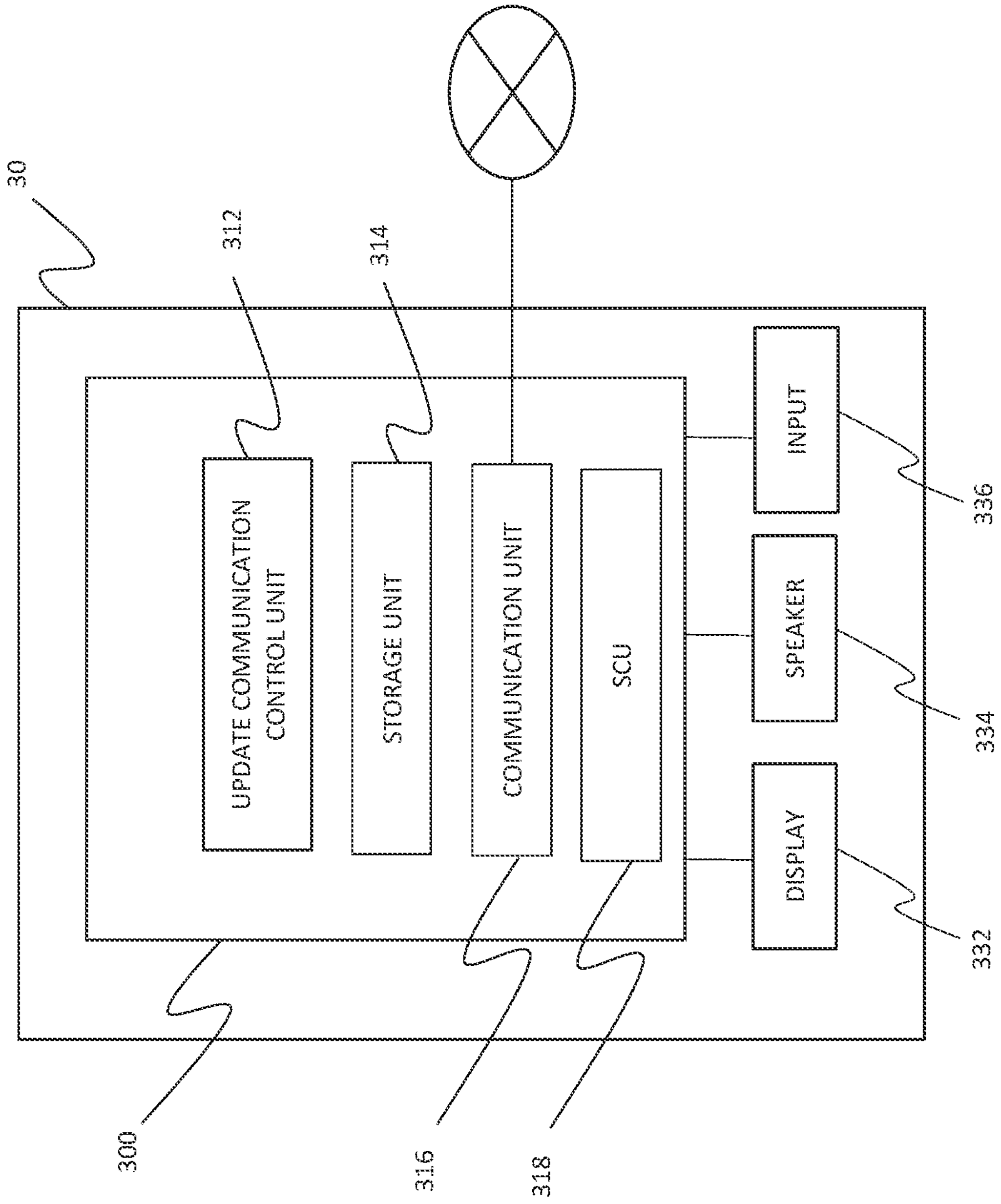
FIG. 6 schematically shows a configuration of the mobile terminal.

FIG. 6 schematically shows a configuration of the mobile terminal 30. The mobile terminal 30 includes a control system 300. The control system 300 is responsible for control of the mobile terminal 300 and communication with the server 70 via the communication network such as a mobile communication network through the communication unit 316 such as a network card. The control system 300 may be also communication with the vehicle 20 through the short range communication unit (SCU) 318 via short range communication such as Bluetooth®. The control system 300 includes an update communication control unit 312 and a storage unit 314. The control system 300 also controls an output device of the mobile terminal 30 such as a display device 332 and a speaker 334 to output information, and also control an input device 336 such as a keyboard and a touch panel to receive input information from a user.

When a new version of a program is released, the program update control unit 112 of the server 70 stores it and identifies a vehicle which is subject to update. In many cases, the program update is directed to a specific model, a specific year, a specific trim or a specific region and so on. The program update control unit 112 assigns a unique identification "UPDATE ID" or "CAMPAIGN ID" to the program update, identifies all vehicles subject to the program update, and save the data with the correlation therebetween. FIG. 7 is an example of a table which shows data structure stored in the server 70. When the subject vehicle is identified, the program update control unit 112 communicates with the vehicle 20 which is subject to the update and causes the vehicle 20 to download and save the new program thereon to update the program by rewriting the program for an ECU. Before starting the download, the program update control unit 112 may obtain an approval for the download from a user of the subject vehicle. For example, the program update control unit 112 sends information such as version information and detailed feature or improvement of the new program to the vehicle 20. The rewriting control unit 220 displays version information and detailed feature or improvement of the new program on the IVI 299 and/or MID 298, and prompts approval by a user. The program update control unit 112 may also send the information such as version information and detailed feature or improvement of the new program to the mobile terminal 30. The update communication control unit 312 displays version information and detailed feature or improvement of the new program on the display device 332, prompts approval by a user to be input via the input device 336.

For example, the program update processing is executed when a device that is a target of the program update is an ECU and a memory for firmware storage of the ECU is a single bank memory (so-called singled-sided ROM). In this case, since a program storage area for firmware storage of the ECU is one, the update program cannot be written to the program storage area when the ECU is operating according to a program stored in the program storage area. When performing the program update of the ECU, the rewriting control unit 220 is configured to transfer the update program stored in the storage unit 270 to the ECU, to cause the update program to be stored in a predetermined data storage area of the ECU, and thereafter, to instruct the ECU for the program update.

For example, program update processing is executed when a storage unit provided to an ECU is a double bank memory (so-called double-sided ROM). In this case, since the ECU has two program storage areas for firmware storage, the update program can be written to a second program storage area when the ECU is operating according to a program stored in a first program storage area. That is, by so-called backside writing, the update program can be written to the second program storage area that is a backside. Therefore, for example, even when the vehicle 20 is traveling, the update program can be written to the second program storage area. For this reason, when the rewriting control unit 220 transfers the update program to the ECU, the rewriting control unit instructs the ECU to write the update program to the second program storage area. When the writing of the update program to the second program storage area of the ECU is completed, a state where the program update of the ECU can be performed becomes.

Figure 8:
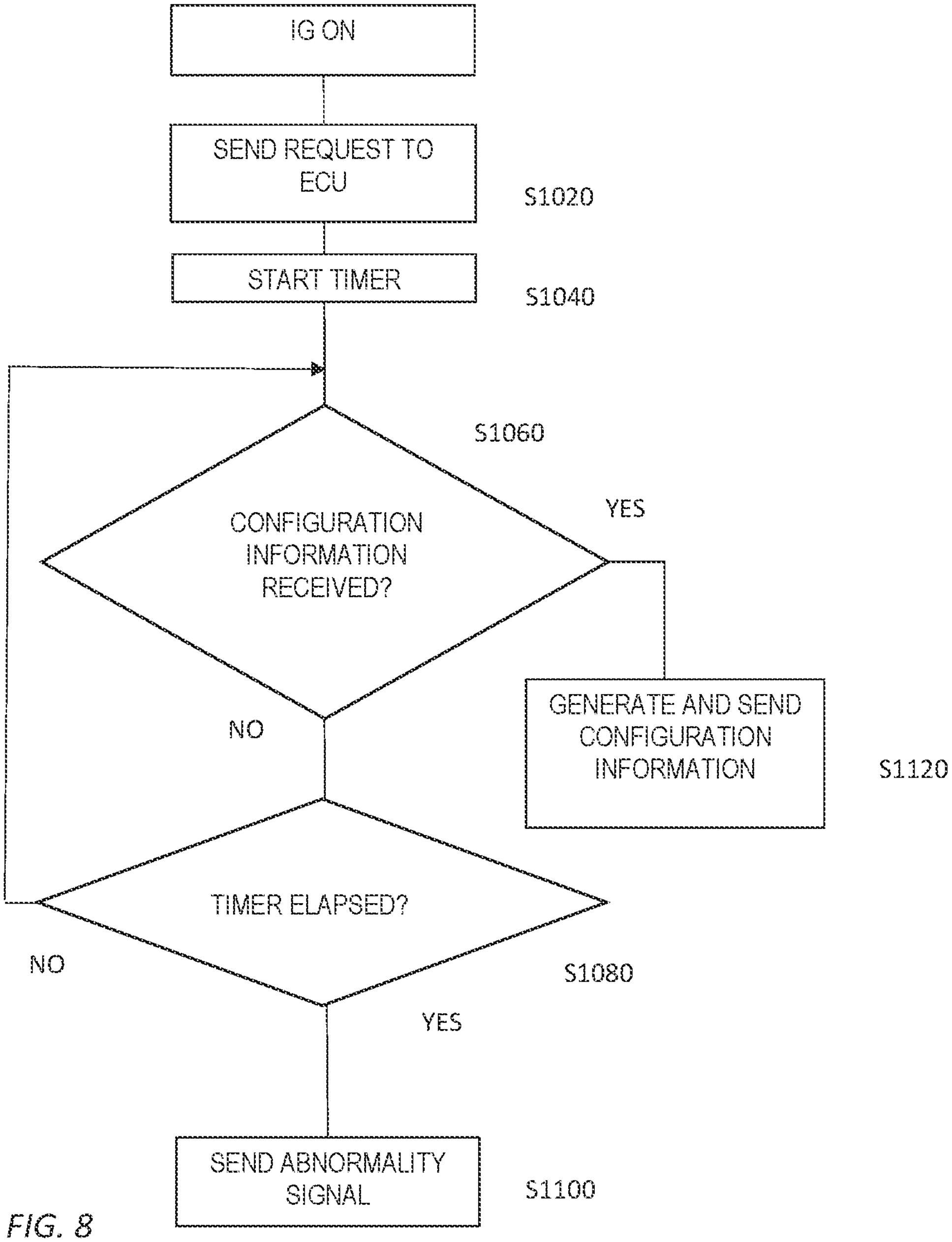
FIG. 8 shows a processing of a program update method of a mobile object according to one embodiment of the present application.

Now, a processing of a program update method of a mobile object according to one embodiment of the present application is described. FIG. 8 shows a processing of a program update method of a mobile object according to one embodiment of the present application. The processing of FIG. 8 of the present embodiment is performed after the new program has been downloaded to the vehicle 20 from the server 70 via the communication network. When the IG power supply becomes on from off state, the rewriting control unit 220 sends a request to a target ECU which is an ECU subject to the currently ongoing program update at step S1020. FIG. 9 is an example of a table which shows data structure stored in the mobile object 70. For example, the rewriting control unit 220 may manage the target ECU by associating the ECU with the update ID. As shown by FIG. 9, the table includes a program update ID, a version information, a status indicator, a result of program update, a feature of the program update such as improved function, and a subject ECU.

Then, the rewriting control unit 220 starts a timer to count down a predetermined amount of time at step S1040. For example, the predetermined amount of time can be decided based on normal expectation to a response time from the subject ECU. Then, the rewriting control unit 220 determines whether the target ECU has sent requested information regarding configuration such as hardware configuration of the target ECU and/or software configuration of the target ECU at step S1060. When the determination is affirmative, based on the received information, the rewriting control unit 220 generates configuration information of the vehicle 20 and sends the generated configuration information to the external server 70 via the communication network 90.

When the determination at step S1060 is negative, the rewriting control unit 220 determines whether the timer has elapsed or not at step S1080. When the determination is negative, the loop goes back to step S1060. On the other hand, when the determination is affirmative, the rewriting control unit 220 sends an abnormality signal to the sever 70 via the communication network 90 at step S1100. FIG. 10 is an example of data structure of abnormality signal. As shown by FIG. 10, the abnormality signal includes the program update ID, VIN and abnormality indicator.

Figure 11:
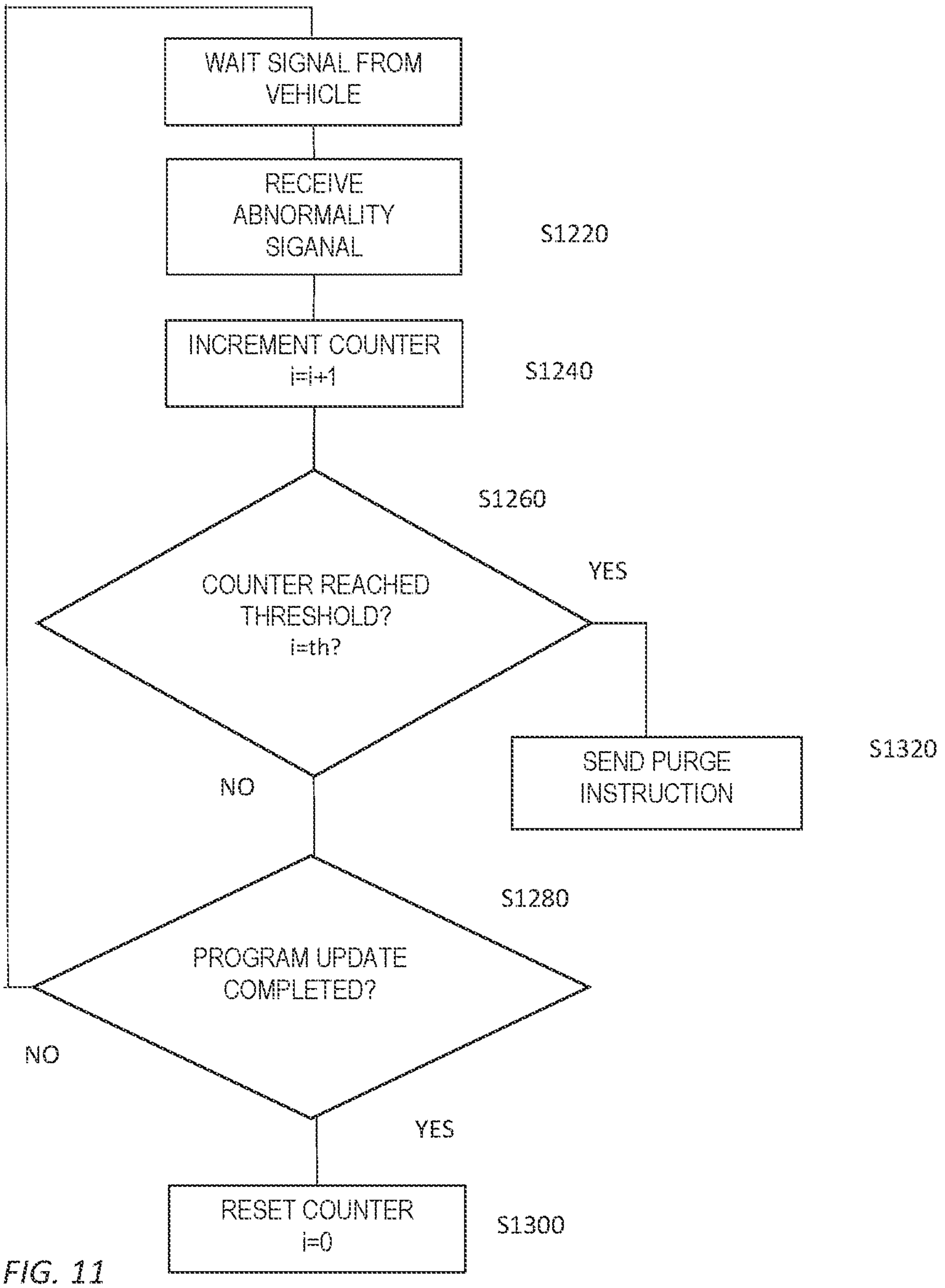
FIG. 11 shows a processing of a program update method of a mobile object according to one embodiment of the present application.

Next, a processing of a program update method of a mobile object performed by the server according to one embodiment of the present application is described. FIG. 11 shows a processing of a program update method of a mobile object according to one embodiment of the present application. FIG. 12 is an example of a table which shows data structure stored in the server 70. The server 70 manages the program update per program update ID per subject vehicle. As shown by FIG. 12, the table includes a program update ID, VIN, a version information, a status indicator, a result of program update, a feature of the program update such as improved function, the number of received abnormality signal and a threshold.

The program update control unit 112 receives abnormality signal at step S1220. Then, program update control unit 112 increments a counter value "i" which indicates the number of received abnormality signal at step S1240. Then, the program update control unit 112 determines whether the counter value has reached the threshold "th" at step S1260. When the determination is negative, the program update control unit 112 determines whether the current program update has been completed at step S1280. When the determination is affirmative, the program update control unit 112 updates the status indicator in FIG. 12 and resets the counter value at step S1300. When the determination is negative at step S1280, the program update control unit 112 waits another signal from the vehicle 20. On the other hand, when the determination is affirmative at step S1260, the program update control unit 112 sends a purge instruction with program update ID to the vehicle 20.

Figure 13:
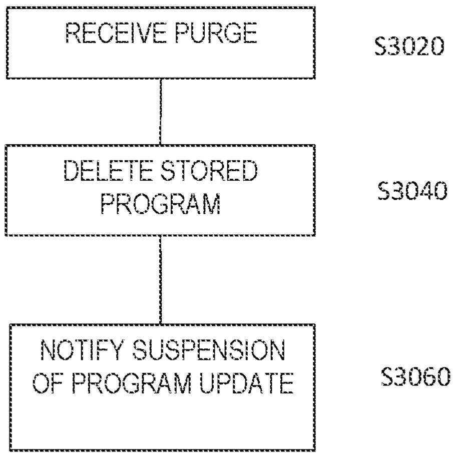
FIG. 13 shows a processing of a program update method of a mobile object according to one embodiment of the present application.

Next, a processing of a program update method of a mobile object performed by the mobile object according to one embodiment of the present application is described. FIG. 13 shows a processing of a program update method of a mobile object according to one embodiment of the present application. The rewriting control unit 220 receives a purge instruction from the server 70 at step S3020. Then according to the received purge instruction, the rewriting control unit 220 identifies the new program to be deleted, and deletes the stored new program at step S3040. In a case of the single bank memory, the new program to be deleted is stored in the storage unit 270. In a case of the double bank memory, the new program to be deleted may be stored in one of the memory devices of the ECU.

Figure 14:
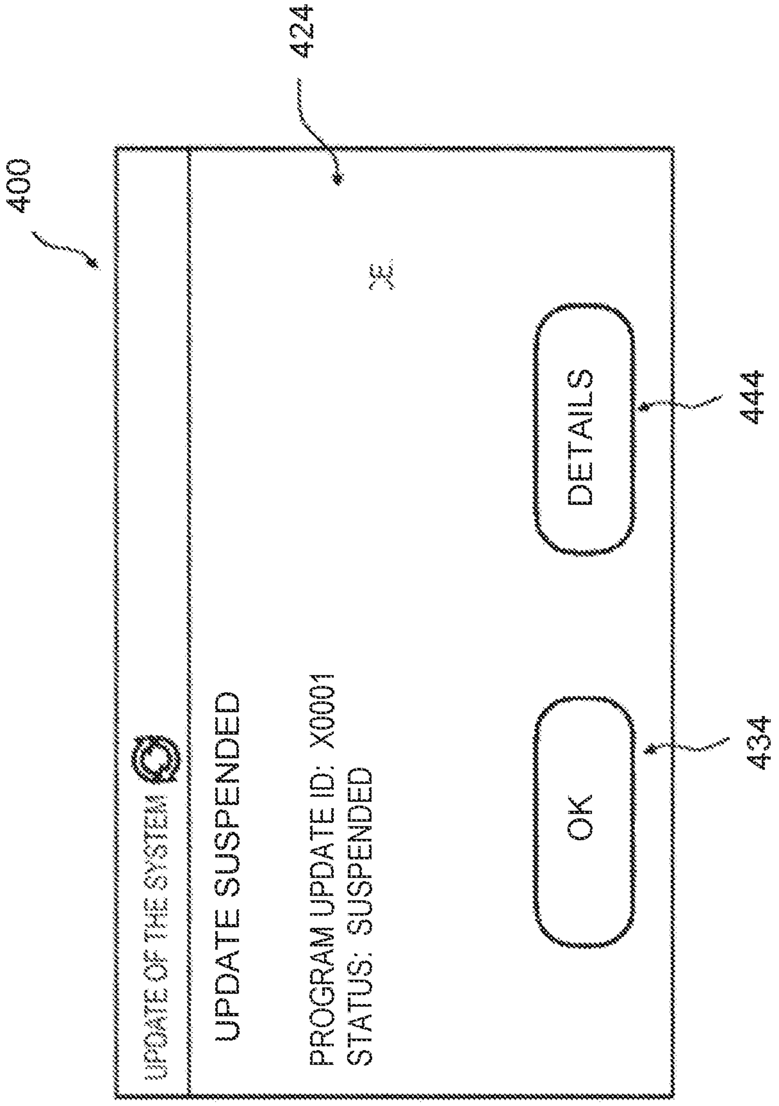
FIG. 14 shows an example of update suspension screen 400.

The rewriting control unit 220 performs a notification to a user of the status of the program uprate, that is, the program update is suspended. FIG. 14 shows an example of update suspension screen 400. For example, the rewriting control unit 220 may display on the IVI 299 and/or MID 298 the update suspension screen 400.

The present application is not limited to this embodiment. The update suspension screen 400 may be displayed on the display device 332 of the mobile terminal 30. In this embodiment, the mobile terminal 30 may receive program update suspension information from the server 70 via the communication unit 316. Alternatively, the mobile terminal 30 may receive program update suspension information from the vehicle 20 via the SCU 318.

For example, a specific program update may be directed to a specific ECU which has firmware requiring heavier processing load and longer response time. In such a case, it is preferable to set the threshold to a larger number. Thus, by varying and adjusting the threshold depending on the specific program update (specific campaign), it becomes possible to improve accuracy in determining the cause of the information acquisition failure. Also, it becomes possible to avoid unnecessary purging processes, which could prevent increased communication costs and delays in software updates.

In the above embodiment, the timer starts counting down at step S1040 after sending a request at step S1020. However, the embodiment is not limited to this scheme. The rewriting control unit 220 may start a timer to count down the predetermined amount of time before sending a request at step S1020 instead of after step S1020.

Second Embodiment

Figure 15:
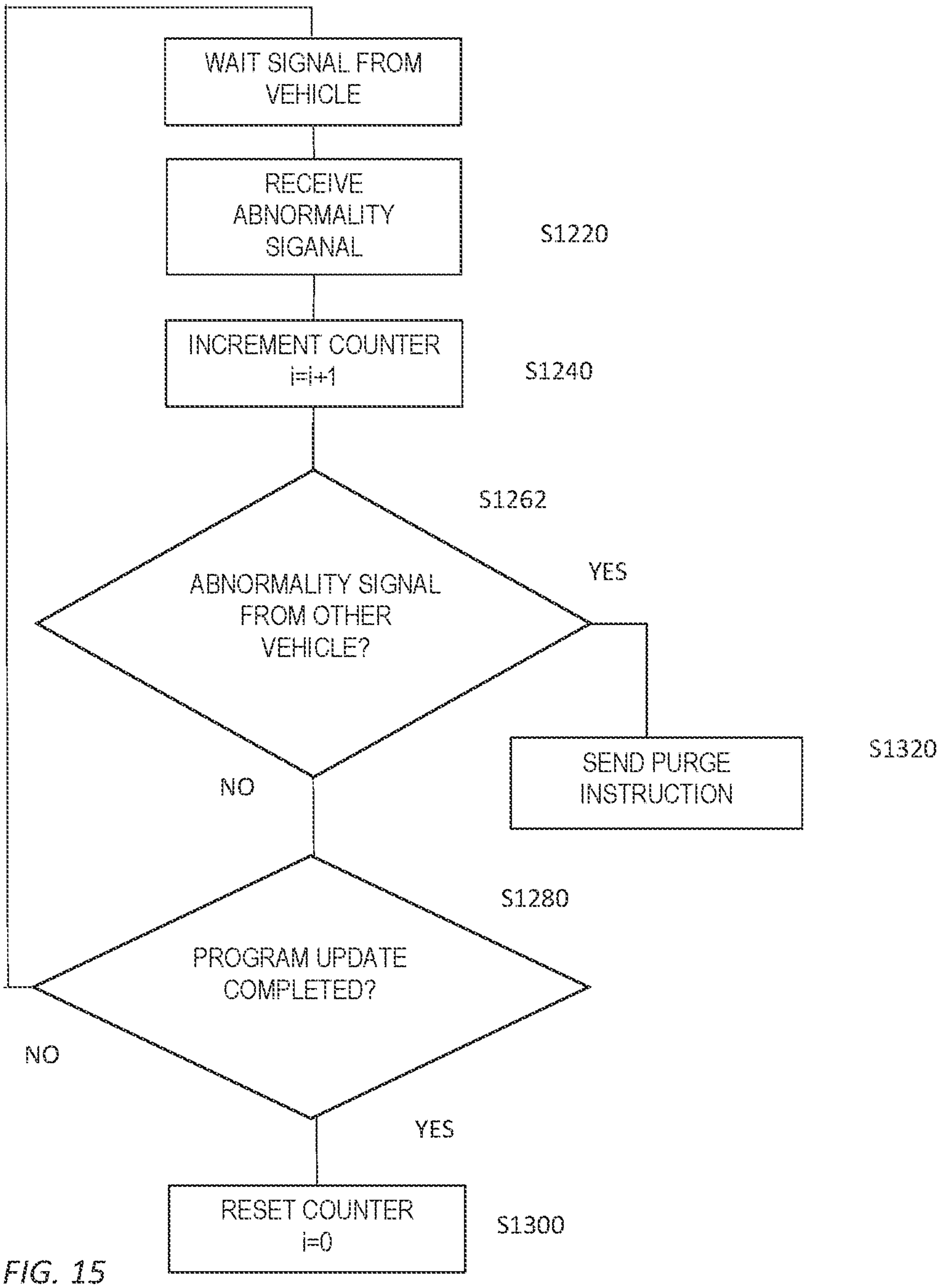
FIG. 15 shows a processing of a program update method of a mobile object according to another embodiment of the present application.

In the above embodiment, the number of received abnormality signal is primarily used to determine whether a purge process is required or not. The status of program update of the other vehicles in the same campaign ID may be used for the determination. FIG. 15 shows a processing of a program update method of a mobile object according to another embodiment of the present application. Different from FIG. 11, the program update control unit 112 determines whether other vehicle in the same campaign ID has sent the abnormality signal or not at step S1262. When the determination is affirmative, the program update control unit 112 sends purge instruction.

The fact that the other vehicle also sends abnormality signal may be interpreted that information acquisition failure may happen more frequently in the current program update. Thus, by using the status of the program update among other vehicles, it becomes possible to improve accuracy in determining the cause of the information acquisition failure.

Variation

In the above embodiment, whether other vehicle in the same campaign ID has sent the abnormality signal is used as a condition for deciding necessity to send a purge signal. However, the embodiment is not limited to this configuration. For example, the server 70 may vary the threshold value depending on the event that other vehicle in the same campaign ID has sent the abnormality signal. For example, the program update control unit 112 may lower the threshold value when the server 70 receives the abnormality signal from other vehicle in the same campaign ID.

Figure 16:
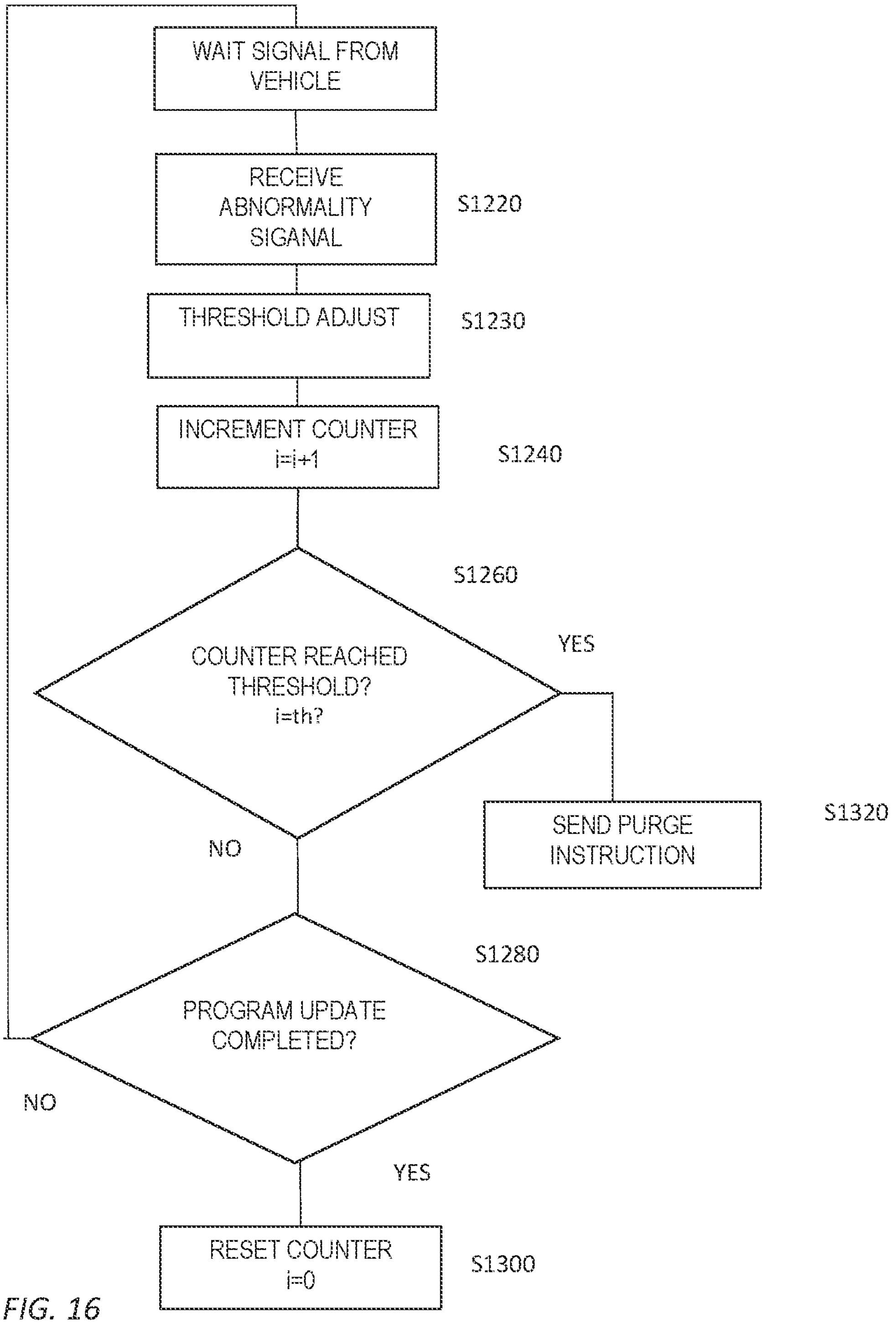
FIG. 16 shows a processing of a program update method of a mobile object according to another embodiment of the present application.
Figure 17:
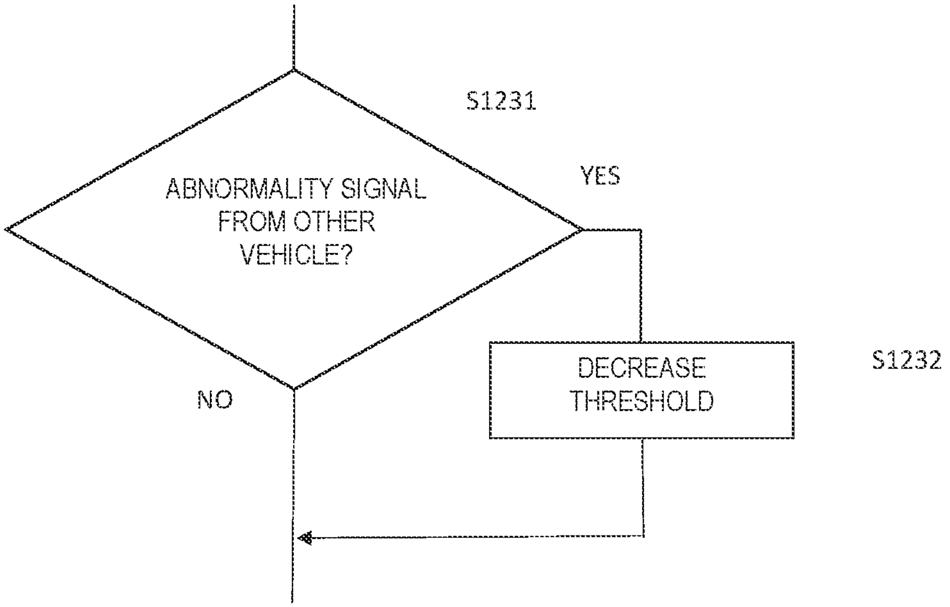
FIG. 17 shows a processing of threshold adjustment step.

FIG. 16 shows a processing of a program update method of a mobile object according to another embodiment of the present application. Different from FIG. 11, the program update control unit 112 has threshold adjust step at step S1230. FIG. 17 shows a processing of threshold adjust step. As shown by FIG. 17, the program update control unit 112 determines whether other vehicle in the same campaign ID has sent the abnormality signal or not at step S1231. When the determination is affirmative, the program update control unit 112 decreases the value of the threshold "th" at step S1232.

By this structure, it is possible to reflect to the threshold value the status of the program update among other vehicles in the same campaign ID. Thus, it becomes possible to improve accuracy in determining the cause of the information acquisition failure.

Third Embodiment

Figure 18:
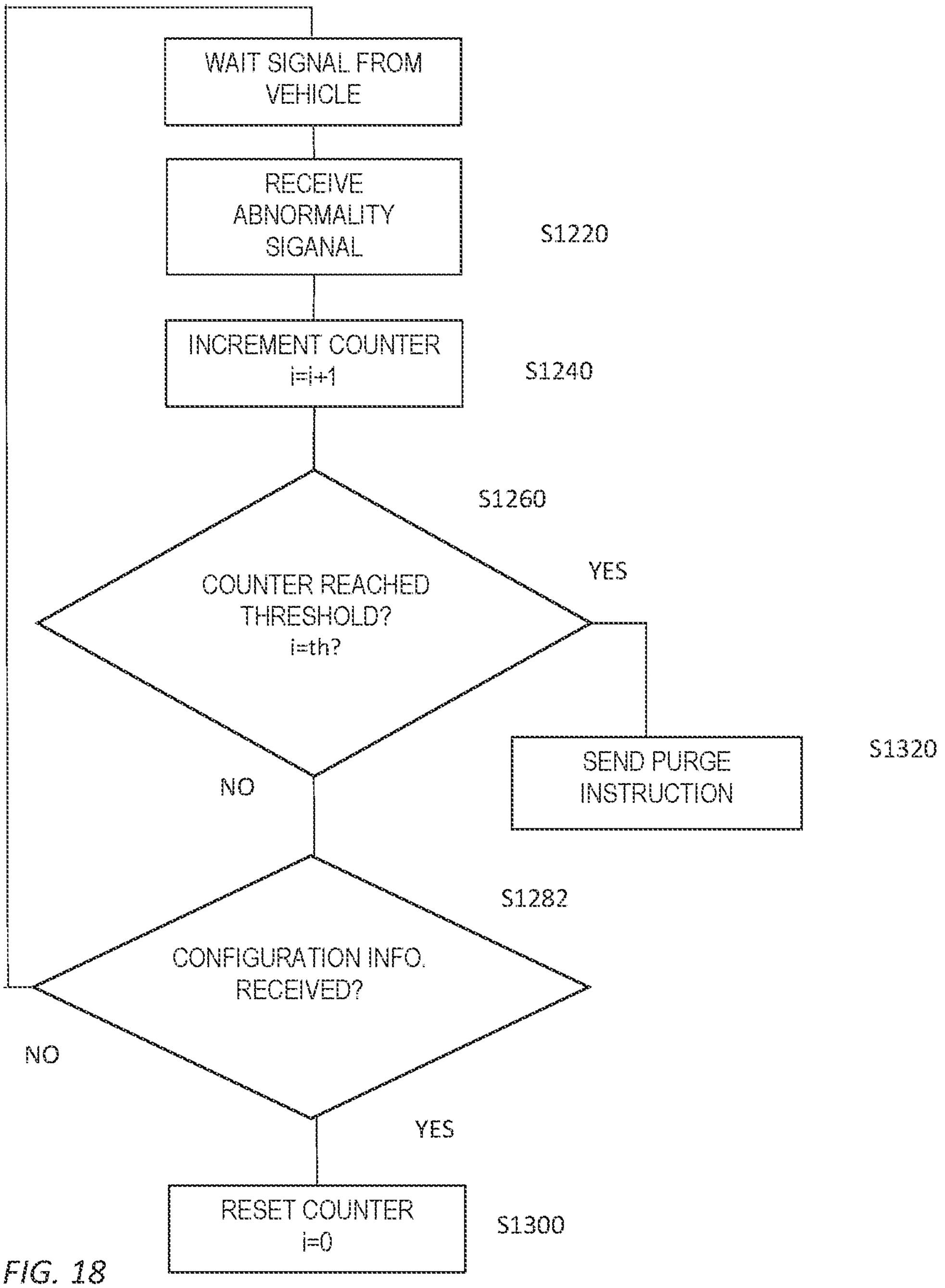
FIG. 18 shows a processing of a program update method of a mobile object according to another embodiment of the present application.

FIG. 18 shows a processing of a program update method of a mobile object according to another embodiment of the present application. The condition that the server 70 receives the abnormality signal predetermined number of times continuously without interruption by successful configuration synchronization may be used. Every time the vehicle 20 is powered on, the rewriting control unit 220 performs the configuration synchronization. Depending on several factors which are not a failure of system, the target ECU may or may not send a response in the predetermined amount of time. Different from FIG. 11, the program update control unit 112 determines whether configuration information is received from the vehicle 20 at step S1282. This means that configuration synchronization is successful after the abnormality signal has been sent. When the determination is affirmative, the program update control unit 112 resets the counter at step S1300.

By having a condition of receiving abnormal signal continuously from the same vehicle (regarding the same program update ID), it is possible to exclude a false situation in which actual failure would not occur. Thus, it becomes possible to improve accuracy in determining the cause of the information acquisition failure.

Fourth Embodiment

FIG. 19 is an example of a table which shows data structure stored in the vehicle 20. The table of FIG. 19 includes additionally a timer value associated with the program update ID. The server 70 may vary or adjust the timer value used by the rewriting control unit 220 at step S104 in FIG. 8. For example, the program update control unit 112 of the server 70 sends a specific timer value associated with the program update ID to the vehicle 20. The rewriting control unit 220 receives the timer value and updates the table of FIG. 19, that is, updates the timer value associated with the program update ID.

By this structure, the predetermined amount of time to be used for determining necessity of abnormality signal may be adjusted by the server 70. Thus, it becomes possible to improve accuracy in determining the cause of the information acquisition failure.

Figure 20:
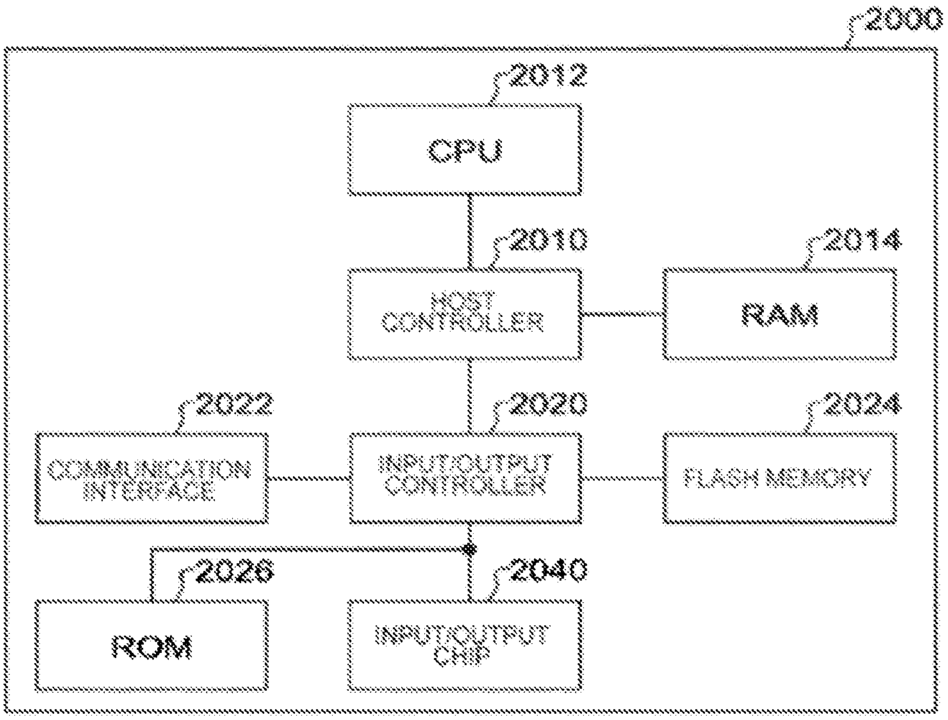
FIG. 20 shows an example of a computer 2000 where a plurality of embodiments of the present disclosure may be entirely or partially embodied.

FIG. 20 shows an example of a computer 2000 where a plurality of embodiments of the present disclosure may be entirely or partially embodied. A program that is installed in the computer 2000 can cause the computer 2000 to function as a system such as the control system of the embodiment or each unit of the system or as an apparatus such as an information processing apparatus or each unit of the apparatus, to execute operations associated with the system or each unit of the system or the apparatus or each unit of the apparatus, and/or to execute the process of the embodiment or steps thereof. Such a program may be executed by a CPU 2012 so as to cause the computer 2000 to execute a specific operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input and output chip 2040. The ROM 2026, the flash memory 2024, the communication interface 2022, and the input and output chip 2040 are connected to the host controller 2010 via an input and output controller 2020.

The CPU 2012 is configured to operate according to programs stored in the ROM 2026 and the RAM 2014, thereby controlling each unit.

The communication interface 2022 is configured to communicate with other electronic devices via a network. The flash memory 2024 is configured to store a program and data that are used by the CPU 2012 in the computer 2000. The ROM 2026 is configured to store a boot program or the like that is executed by the computer 2000 at boot-up, and/or a program depending on hardware of the computer 2000. The input and output chip 2040 may also be configured to connect various input and output units such as a keyboard, a mouse, and a monitor, to the input and output controller 2020 via input and output ports such as a serial port, a parallel port, a keyboard port, a mouse port, a monitor port, a universal serial bus (USB) port and a high-definition multimedia interface (HDMI (registered trademark)) port.

A program is provided via a computer-readable storage medium such as a CD-ROM, a DVD-ROM, or a memory card, or a network. The RAM 2014, the ROM 2026, or the flash memory 2024 is an example of the computer-readable storage medium. The program is installed in the flash memory 2024, the RAM 2014 or the ROM 2026 and is executed by the CPU 2012. Information processing described in these programs is read into the computer 2000, resulting in cooperation between the programs and the various types of hardware resources described above. An apparatus or a method may be constituted by realizing an operation or processing of information according to a use of the computer 2000.

For example, when communication is performed between the computer 2000 and an external device, the CPU 2012 may be configured to execute a communication program loaded onto the RAM 2014 to instruct communication processing to the communication interface 2022, based on processing described in the communication program. The communication interface 2022 is configured, under control of the CPU 2012, to read transmission data stored on a transmission buffer processing area provided in a recording medium such as the RAM 2014 and the flash memory 2024, to transmit the read transmission data to the network, and to write reception data received from the network to a reception buffer processing area or the like provided on the recording medium.

In addition, the CPU 2012 may be configured to cause all or a necessary portion of a file or a database, which has been stored in a recording medium such as the flash memory 2024, to be read into the RAM 2014, thereby executing various types of processing on the data on the RAM 2014. Next, the CPU 2012 is configured to write the processed data back to the recording medium.

Various types of information, such as various types of programs, data, tables, and databases, may be stored in the recording medium and may be subjected to information processing. The CPU 2012 may be configured to execute, on the data read from the RAM 2014, various types of processing including various types of operations, processing of information, conditional judgment, conditional branching, unconditional branching, search and replacement of information, and the like described in the present specification and specified by instruction sequences of the programs, and to write a result back to the RAM 2014. The CPU 2012 may also be configured to search for information in a file, a database, etc., in the recording medium. For example, when a plurality of entries, each having an attribute value of a first attribute associated with an attribute value of a second attribute, is stored in the recording medium, the CPU 2012 may be configured to search for an entry having a designated attribute value of the first attribute that matches a condition from the plurality of entries, and to read the attribute value of the second attribute stored in the entry, thereby obtaining the attribute value of the second attribute associated with the first attribute that satisfies a predetermined condition.

The programs or software modules described above may be stored in a computer-readable storage medium on or near the computer 2000. A recording medium such as a hard disk or a RAM provided in a server system connected to a dedicated communication network or the Internet can be used as a computer-readable storage medium. The program stored in the computer-readable storage medium may be provided to the computer 2000 via the network.

A program that is installed in the computer 2000 and causes the computer 2000 to function as the control system 200 may work on the CPU 2012 and the like to cause the computer 2000 to function as each unit of the control system 200, respectively. Information processing described in these programs are read into the computer 2000 to cause the computer to function as each unit of the control system 200, which is a specific means realized by cooperation of software and the various types of hardware resources described above. Then, with these specific means, by realizing computing or processing of information according to an intended use of the computer 2000 in the present embodiment, the specific control system 200 is constructed according to the intended use.

Similarly, a program that is installed in the computer 2000 and causes the computer 2000 to function as the control system 100 may work on the CPU 2012 and the like to cause the computer 2000 to function as each unit of the control system 100, respectively. Information processing described in these programs are read into the computer 2000 to cause the computer to function as each unit of the control system 100, which is a specific means realized by cooperation of software and the various types of hardware resources described above. Then, with these specific means, by realizing computing or processing of information according to an intended use of the computer 2000 in the present embodiment, the specific control system 100 is constructed according to the intended use.

Similarly, a program that is installed in the computer 2000 and causes the computer 2000 to function as the control system 300 may work on the CPU 2012 and the like to cause the computer 2000 to function as each unit of the control system 300, respectively. Information processing described in these programs are read into the computer 2000 to cause the computer to function as each unit of the control system 300, which is a specific means realized by cooperation of software and the various types of hardware resources described above. Then, with these specific means, by realizing computing or processing of information according to an intended use of the computer 2000 in the present embodiment, the specific control system 300 is constructed according to the intended use.

Various embodiments have been described with reference to the block diagrams and the like. In the block diagrams, each block may represent (1) a step of a process in which an operation is executed, or (2) each unit of an apparatus having a role in executing the operation. Certain steps and each unit may be implemented by dedicated circuitry, programmable circuitry supplied with computer-readable instructions stored on computer-readable storage media, and/or processors supplied with computer-readable instructions stored on computer-readable storage media. The dedicated circuitry may include a digital and/or analog hardware circuit, or may include an integrated circuit (IC) and/or a discrete circuit. The programmable circuitry may include a reconfigurable hardware circuit including logical AND, logical OR, logical XOR, logical NAND, logical NOR, and other logical operations, a memory element such as a flip-flop, a register, a field programmable gate array (FPGA) and a programmable logic array (PLA), and the like.

Computer-readable storage media may include any tangible device that can store instructions to be executed by a suitable device, and as a result, the computer-readable storage medium having the instructions stored thereon constitutes at least a part of an article of manufacture including instructions that can be executed to provide means for performing operations specified in the processing procedures or block diagrams. Examples of the computer-readable storage media may include an electronic storage medium, a magnetic storage medium, an optical storage medium, an electromagnetic storage medium, a semiconductor storage medium, and the like. More specific examples of the computer-readable storage media may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disk (DVD), a Blu-ray (registered trademark) disk, a memory stick, an integrated circuit card, and the like.

Computer-readable instructions may include assembler instructions, instruction-set-architecture (ISA) instructions, machine instructions, machine dependent instructions, microcode, firmware instructions, state-setting data, or either source code or object code described in any combination of one or more programming languages, including an object oriented programming language such as Smalltalk (registered trademark), JAVA (registered trademark) and C++, and a conventional procedural programming language such as a 'C' programming language or similar programming languages.

Computer-readable instructions may be provided to a processor of a general purpose computer, a special purpose computer, or other programmable data processing apparatus, or to programmable circuitry, locally or via a local area network (LAN), wide area network (WAN) such as the Internet, etc., and the computer-readable instructions may be executed to provide means for performing operations specified in the described processing procedures or block diagrams. Examples of processors include computer processors, processing units, microprocessors, digital signal processors, controllers, microcontrollers, and the like.

Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications. In the accompanying claims, a processor is not limited to a single processor, a processor may be implemented by one or more processor. Also, multiple processes or functions may be implemented by a single processor.

The operations, procedures, steps, stages and the like of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A program update method of a mobile object by acquiring new program from a server device via a network, the method comprising:

(i) determining by the mobile object whether a predetermined abnormal condition is met or not, and when it is determined that the predetermined abnormal condition is met, sending a signal indicating abnormality from the mobile object to the server device, wherein the predetermined abnormal condition is met when the mobile object does not receive a configuration information from an electronic control unit, which is subject to the current program update, when the mobile object is powered on, the electronic control unit being equipped with the mobile object;

(ii) determining by the server device whether a purge process is required or not based on the received signal indicating abnormality, and when it is determined that the purge process is required, sending a purge instruction commanding deletion from the server device to the mobile object;

(iii) according to the received purge instruction, by the mobile object, deleting a data stored in a memory device equipped with the mobile object regarding update of a program of the electronic control unit subject to the current program update to cause the mobile object to re-download the data regarding update of the program of the electronic control unit from the server device.

2. The program update method of the mobile object according to claim 1, wherein the step (ii) determines whether the purge process is required or not by using the number of times the server device has received the signal indicating abnormality from the mobile object or by using frequency the server device has received the signal indicating abnormality from the mobile object.

3. The program update method of the mobile object according to claim 2, wherein the step (ii) uses a threshold value to be compared with the number of times, and wherein the threshold value is varied depending on a model of the mobile object.

4. The program update method of the mobile object according to claim 3, wherein the step (ii) determines whether the server device has continuously received the signal indicating abnormality from the mobile object the number of times defined by the threshold value.

5. The program update method of the mobile object according to claim 3, wherein the server device sends a campaign information to all mobile objects belonging to one campaign group, and the one campaign group corresponds to a specific one model of the mobile object.

6. The program update method of the mobile object according to claim 5, further comprises:

(iv) updating the threshold value based on result of program update among the mobile objects belonging to the one campaign group.

7. The program update method of the mobile object according to claim 1, wherein the mobile object waits the configuration information from the electronic control unit for a predetermined amount of time before determining that the predetermined abnormal condition is met.

8. The program update method of the mobile object according to claim 7, wherein the predetermined amount of time is varied according to an instruction from the server device.

9. The program update method of the mobile object according to claim 1, wherein the mobile object determines whether the predetermined abnormal condition is met or not every time the mobile object is powered on.

10. The program update method of the mobile object according to claim 1, wherein powering on the mobile object includes turning on an ignition of the mobile object or powering on by pressing a brake pedal of the mobile object.

11. The program update method of the mobile object according to claim 1, wherein when the predetermined abnormal condition is met, performing a notice by the mobile object to a user that the current program update is suspended.

12. The program update method of the mobile object according to claim 1, wherein the server device sends a campaign information to all mobile objects belonging to one campaign group, the one campaign group corresponds to a specific one model of the mobile object, and wherein the step (ii) determines whether other mobile object belonging to the one campaign group sent the signal indicating abnormality to the server device.

13. A program update system comprising:

a server device; and a mobile object, wherein the mobile object comprises:

an acquisition processor acquiring new program from the server deice via a network, and a rewriting control processor performing a rewriting control of rewriting a program of an electronic control unit equipped with the mobile object, the rewriting being performed by using the acquired new program during drive of the mobile object is disabled, the rewriting control processor determining whether a predetermined abnormal condition is met or not, and when it is determined that the predetermined abnormal condition is met, sending a signal indicating abnormality from the mobile object to the server device, wherein the predetermined abnormal condition is met when the mobile object does not receive a configuration information from an electronic control unit, which is subject to the current program update, when the mobile object is powered on, the electronic control unit being equipped with the mobile object, wherein the server device comprises a program update control processor determining whether a purge process is required or not based on the received signal indicating abnormality, and when it is determined that the purge process is required, sending a purge instruction commanding deletion from the server device to the mobile object, and wherein the rewriting control processor of the mobile object, according to the received purge instruction, deletes a data stored in a memory device equipped with the mobile object regarding update of the program of the electronic control unit subject to the current program update to cause the mobile object to re-download the data regarding update of the program of the electronic control unit from the server device.

14. A mobile object comprising:

an acquisition processor acquiring new program from a server deice via a network; and a rewriting control processor performing a rewriting control of rewriting a program of an electronic control unit equipped with the mobile object, the rewriting being performed by using the acquired new program during drive of the mobile object is disabled, the rewriting control processor determining whether a predetermined abnormal condition is met or not, and when it is determined that the predetermined abnormal condition is met, sending a signal indicating abnormality from the mobile object to the server device to cause a program update control processor of the server device to determine whether a purge process is required or not based on the received signal indicating abnormality, and to send a purge instruction commanding deletion from the server device to the mobile object when it is determined that the purge process is required, wherein the predetermined abnormal condition is met when the mobile object does not receive a configuration information from an electronic control unit, which is subject to the current program update, when the mobile object is powered on, the electronic control unit being equipped with the mobile object, and wherein the rewriting control processor of the mobile object, according to the received purge instruction, deletes a data stored in a memory device equipped with the mobile object regarding update of the program of the electronic control unit subject to the current program update to cause the mobile object to re-download the data regarding update of the program of the electronic control unit from the server device.

15. The mobile object according to claim 14, wherein the predetermined abnormal condition is met when the mobile object does not receive a configuration information from the electronic control unit, which is subject to the current program update, when the mobile object is powered on.

16. The mobile object according to claim 15, wherein the mobile object waits the configuration information from the electronic control unit for a predetermined amount of time before determining that the predetermined abnormal condition is met after the mobile object is powered on.

17. The mobile object according to claim 15, wherein the predetermined amount of time is varied according to an instruction from the server device.

18. The mobile object according to claim 15, wherein the mobile object determines whether the predetermined abnormal condition is met or not every time the mobile object is powered on.

19. The mobile object according to claim 15, wherein powering on the mobile object includes turning on an ignition of the mobile object or powering on by pressing a brake pedal of the mobile object.

* * * * *